T. H. ELLIOTT.
FRUIT PITTING MACHINE.
APPLICATION FILED MAY 19, 1919.

1,432,282.

Patented Oct. 17, 1922.
3 SHEETS—SHEET 1.

INVENTOR
Thomas H. Elliott
BY
Strong & Townsend
ATTORNEYS

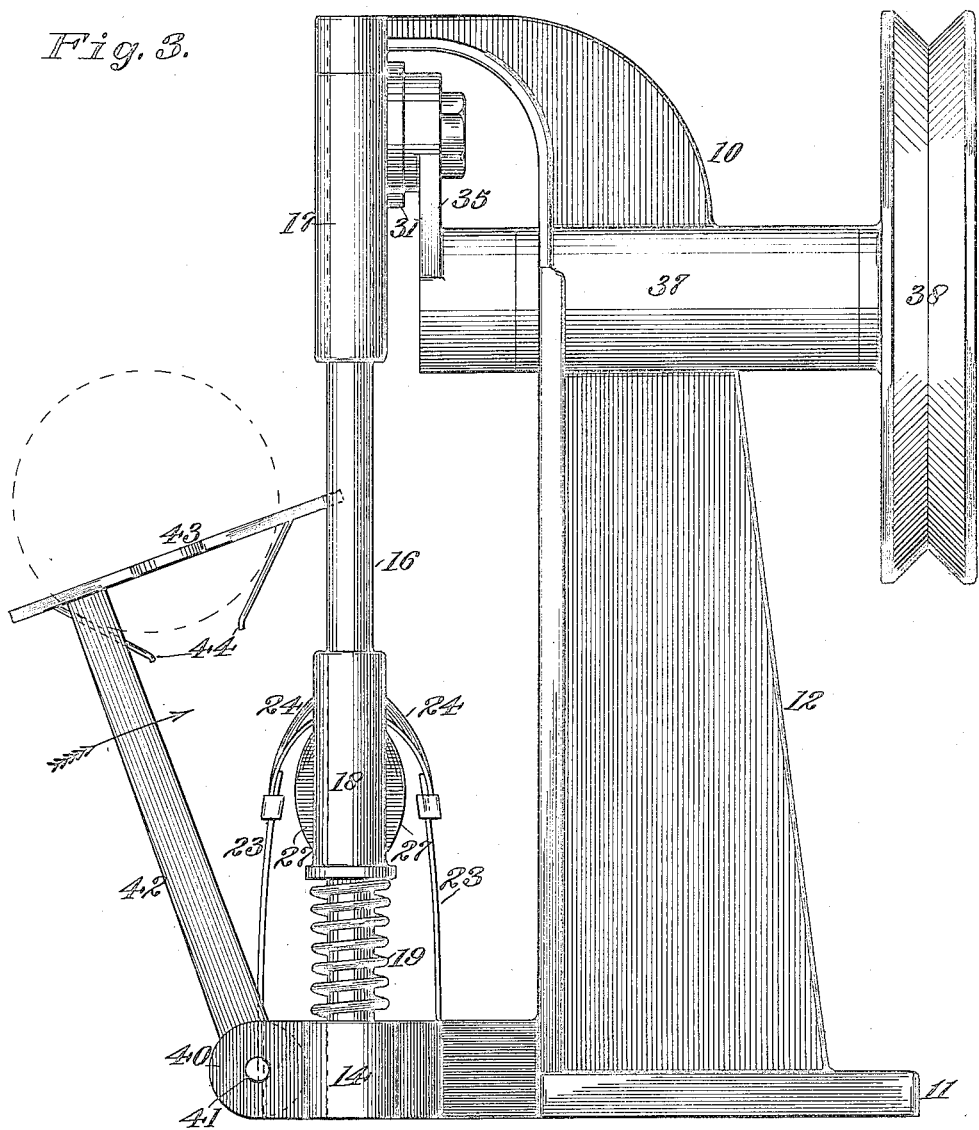

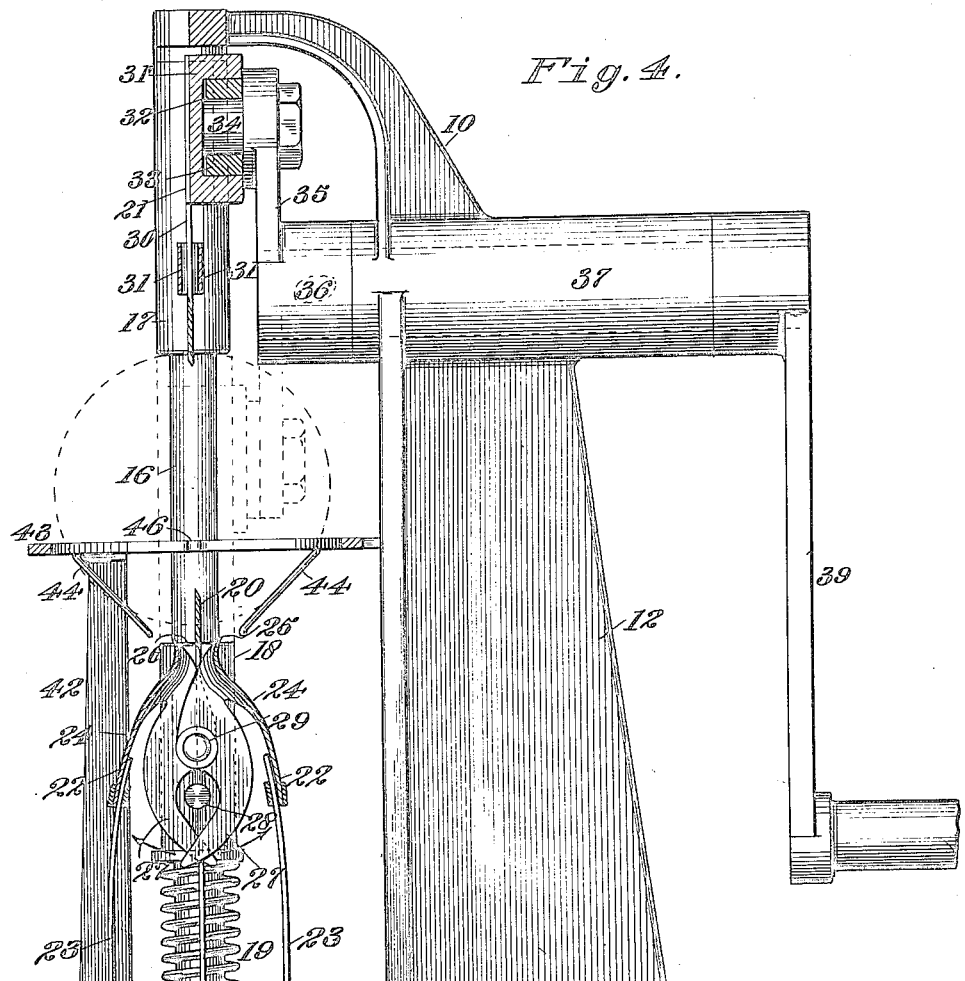

Patented Oct. 17, 1922.

1,432,282

UNITED STATES PATENT OFFICE.

THOMAS HENRY ELLIOTT, OF SELMA, CALIFORNIA.

FRUIT-PITTING MACHINE.

Application filed May 19, 1919. Serial No. 298,012.

*To all whom it may concern:*

Be it known that I, THOMAS H. ELLIOTT, a citizen of the United States, residing at Selma, in the county of Fresno and State of California, have invented new and useful Improvements in Fruit-Pitting Machines, of which the following is a specification.

This invention relates to a fruit pitting machine.

It is the principal object of this invention to provide a simple mechanism whereby drupaceous fruit may be pitted without the possibility of mashing the halves of the fruit and at the same time ensuring that the pit will be cleanly removed from the fruit, said structure being simple and direct in its operation and so designed as to be capable of multiplication in order to increase the capacity of a machine.

The present invention contemplates the use of a slidable halving knife and a knife reciprocably mounted in relation thereto, said knives being disposed in operative relation to a seed extractor and a fruit pitting member.

The invention is illustrated by way of example in the accompanying drawings, in which—

Fig. 3 is a view in side elevation, showing the structure shown in Fig. 1 and particularly disclosing the fruit feeding member.

Fig. 4 is a view, similar to Fig. 3, illustrating a hand-operated pitting mechanism.

Fig. 5 is a view in plan, disclosing the adjustable cup within which the fruit is placed and by which it is fed to the knives.

Figure 1:
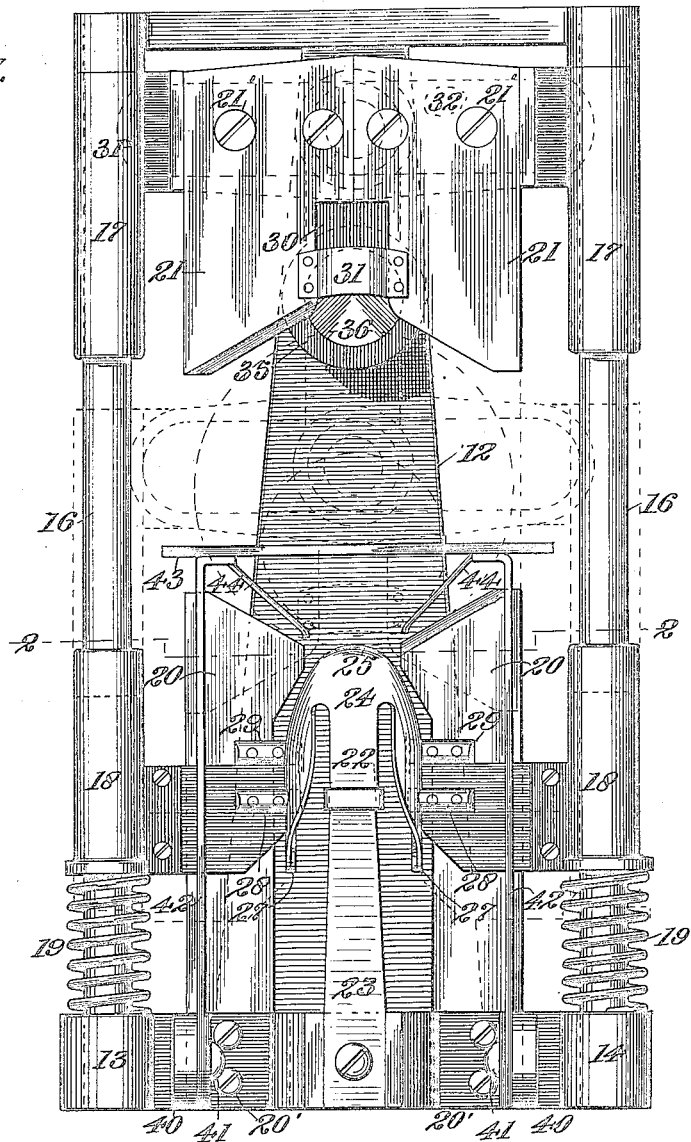
Fig. 1 is a view in side elevation, showing one of the fruit pitting units.

In the drawings, 10 indicates a main frame member having a base portion 11 formed integral with a standard 12. The base portion extends outwardly from the front of the standard and carries a pair of posts 13 and 14 which are spaced an equal distance each side of the vertical center of the frame structure 10. These posts are adapted to receive guide rods 15 and 16 which stand vertically and parallelly to each other. The standard 12 extends upwardly and overhangs the base structure 11 and is there provided with receiving posts for the upper ends of the rods 15 and 16, thus insuring that they will be held in rigid relation to each other at all times.

Slidably mounted upon these rods are upper and lower knife frames 17 and 18, respectively. The lower knife frame is capable of reciprocation upon the guide rods and is held in its uppermost position by means of expansion springs 19. Extending inwardly from the frame 18 are suitable lugs by which lower knives 20 are guided. These knives are formed in pairs and are held in spaced relation to each other.

Figure 2:
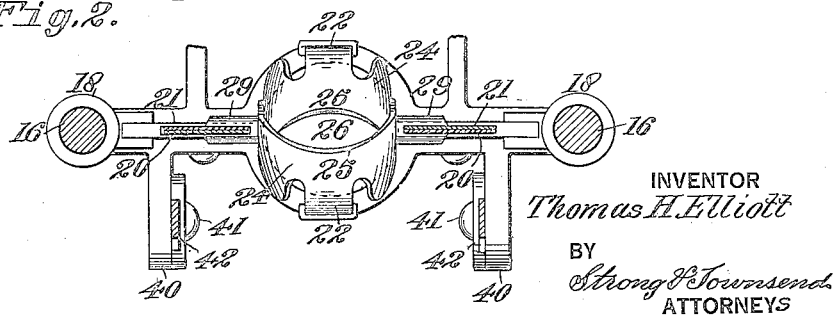
Fig. 2 is a view in horizontal section, on the line 2—2 of Fig. 1.

As shown in Fig. 1, the cutting edges of the knives are downwardly convergent and terminate equal distances upon the opposite sides of the vertical center of the machine. Preferably the cutting edges are beveled in opposite directions and thus cooperate with the oppositely beveled faces of upper knives 21. The space between the lower knives 20 is enlarged at a point directly below the cutting edges and thus provides a suitable clearance for pit-ejecting fingers 22. These fingers comprise spring shanks 23, fixed by their lower ends to the base 11 and detachably carrying pitting cups 24. These cups are arcuate in section and have outwardly turned lips 25 forming an elliptical entry opening 26, as clearly shown in Fig. 2. The cups are arranged with their sides in overlapping relation, due to the provision of the fingers 27, as shown in Fig. 4. The fingers 27 are recessed to accommodate operating pins 28 which move downwardly and are carried by the lower blades 20; the members 24 being hinged to each other by hinge pins 29 carried by the lower blades. Thus by a downward movement of the lower blades 20 and the pins 28 carried thereby the fingers 27 will be encountered and the jaws of the members 24 actuated.

The upper blades 21 have beveled cutting edges extending upwardly and inwardly towards the center of the machine and are formed with a clearance opening 30, adapted to provide clearance for the top of the fruit pit. Secured to each side of this opening is a strap 31 which forms a small slotted passageway into which the edge of the fruit pit may extend and by which the pit will be forced downwardly during the cutting operation and forced between the lips 25 of the ejecting members 24.

It is understood that the blades 21 are detachably secured to their frame 17 by screws 21' and that the blades 20 are detachably secured to the base by screws 20' and that they may be interchangeable when different classes of fruit are being operated upon. The frame 17 embodies a cross-head 31' within which a horizontally extending slot 32 is formed. A sliding bushing 33 is mounted within this slot and is carried upon the end of a crank pin 34. The crank pin is detachably secured to an operating crank 35 which is fixed to a crank shaft 36.

A horizontally disposed bearing 37 is formed as a part of the standard 12 and accommodates the shaft 36. The shaft 36 may be driven by a power pulley 38 or manually operated by the crank 39. It will also be recognized that a plurality of the pitting structures shown in the drawings may be mounted upon a turntable or other suitable conveyer and successively actuated as they pass an operator, thus making it possible to drive a number of shafts 36 by a single power transmission mechanism and suitable timing gears.

Extending outwardly from the base portion 11 of the frame 10 are lugs 40. These lugs carry pivot pins 41 which pass through the lower end of oscillating fingers 42. The fingers 42 carry a fruit-feeding ring 43 which is fixed at their free ends and may thus be swung into the path of travel of the moving knives.

As particularly shown in Fig. 5, the ring 43 is fitted with a number of spring fingers 44. These fingers extend outwardly and inwardly and thus provide an adjustable cup-shaped support for the fruit. Clearance slots 46 are formed upon diametrically opposite sides of the ring 43 and permit the blades 21 to pass downwardly and complete their cutting operation in conjunction with the blades 20.

In operation, the shaft 36 is continuously rotated by a desired timing or transmission mechanism and thus operates the crank 35 to produce reciprocation of the frame 17. An article of fruit is placed within the ring 43 and allowed to rest upon the supporting fingers 44. Care is taken to place this fruit with the seed standing in alignment with the clearance openings at the side of the ring, thus insuring that the edge of the seed will stand in a vertical plane and in alignment with the cutting knives.

As the crank 35 operates, the upper knives 21 will move downwardly and will sever the fruit into two halves, as it is held in the path of travel of this knife after the inward movement of the members 42 and the ring 43. As the knives 21 pass through the fruit they will move into overlapping and sliding relation to the knives 20, thus producing a simultaneous cutting operation of the fruit upon four sides at the same time. When the upper knives have sufficiently entered the fruit the straps 31 will pass along each side of the fruit pit and thereafter force the pit downwardly. At this same time the lower edge of the fruit pit will be wedged between the lips 25 of the ejecting members 24 and the members 24 will swing outwardly upon their pivots 29 to accommodate this movement; the spring fingers 23 yielding to hold the lips 25 against the opposite sides of the seed as it passes therebetween.

When the lower edges of the frame 17 encounters the upper faces of the frame 18 the frame 18 will be caused to move downwardly and the cutting action will at the same time be continued. This frame will carry the pins 28 down against the upper faces of the fingers 27 and will thus cause the members 24 to draw around the upper half of the fruit pit as it is being forced downwardly by the action of the blades 21 and the straps 31. This will produce a complete enveloping action by the members 24 upon the downwardly moving pit and will thus insure that a maximum amount of the meat portion of the fruit will be separated from the seed and will be retained in the two severed halves.

When the knives 21 have reached the bottom of their stroke they will recede to permit the ring 42 to swing outwardly and allow the fruit to be recovered and at the same time will restore the members 24 to their original position; the fruit pit having previously fallen from between these members and through the outlet opening 48. It will thus be seen that the structure here disclosed embodies the use of simple mechanically moving knives operating in conjunction with the fixed knife and means for positively separating the pit of the fruit from the severed halves by a direct and economical method.

While I have shown and described the preferred form of my invention as now known to me, I wish it understood that various changes in the construction, combination and arrangement of parts may be made by those skilled in the art without departing from the spirit of the invention as claimed.

Having thus described my invention, what I claim and desire to secure by Letters Patent, is—

1. A fruit pitting machine comprising a fixed concave splitting knife, a vertically reciprocable knife thereabove, adapted to move downwardly and cooperate with the fixed knife in splitting a fruit, a yieldable two-part ejecting cup, over which the fruit is forced, and by which the pulp of the fruit is separated from the surface of the pit, the lower end of said ejecting cup being open so as to permit the pit to discharge downwardly through the cup upon its removal from the pulp.

2. A fruit pitting machine comprising a two-part fixed splitting knife having concave edges and a space intervening therebetween, a slidable pitting knife having a concave cutting edge adapted to slidably pass the cutting edge of the fixed knife and to cooperate therewith in splitting a fruit, a pair of yieldable pit ejecting members, adapted to penetrate the fruit along the line of the split and to yieldably conform to the contour of the lower half of the pit and positively operating means for progressively closing the pit ejecting members around the upper half of the pit as the operation proceeds.

3. In a fruit pitter of the character described a vertically reciprocable knife with a concave edge, a fixed knife having a concave cutting edge adapted to meet the reciprocable knife against a fruit pit, a fruit carrier consisting of a ring with elastic fingers to receive the fruit, and means to swing the ring into and out of the path of the reciprocating knives, a pit receiving cup beneath the ring and means to move the sides of said cup around the pit to strip the meat therefrom, and means to discharge the meat outside the cup, and the pit down through the center.

4. A fruit pitting machine comprising a fixed knife and a movable knife adapted to co-operate in splitting a fruit, a two part pitting member having an open lower end, yieldable members adapted to support the pitting member and normally maintain the same in its closed position, means whereby the engagement of a pit with the upper end of the pitting member will cause the same to open and yieldably conform to the contour of the lower half of the pit, and positively operating means for progressively closing the pitting member around the upper half of the pit whereby the pit may discharge downwardly through the pitting member.

5. A fruit pitting machine comprising a frame, a splitting knife having a concave edge and adapted to be reciprocably mounted upon said frame, a two part splitting knife fixed in the path of travel of the said reciprocating knife and having a substantially concave cutting edge coacting with the edge of the reciprocal knife to split a fruit, a two part pitting member, means normally maintaining the same in its closed position, the said pitting member adapted to penetrate the fruit along the line of the split and envelope the pit as the splitting operation proceeds, the lower end of said pitting member being open so as to permit the pit to discharge through the pitting member when completely enveloped by the pitting member.

6. In a fruit pitting machine, a set of fixed splitting knives, a set of reciprocating splitting knives operating in conjunction therewith, pit-restricting members adapted to follow the contour of the pit and restrict the same during the downward severing motion of the reciprocating knives, and an oscillating carrier for disposing an article of fruit in the path of travel of said knives and for removing it therefrom after the severing and pitting operation.

7. A fruit pitting machine comprising a frame, a vertically reciprocable splitting knife carried thereby, a pair of fixed splitting knives disposed in the path of travel of said movable knife and adapted to cooperate therewith in splitting a fruit, pit engaging means carried by the movable knife to force the fruit downwardly onto the fixed knives, pitting members adapted to penetrate the fruit along the line of the split as it is forced downwardly and to yieldably conform to the contour of the entering half of the pit and positive means operating as the splitting proceeds to cause said pitting members to conform to the other half of the pit.

8. A fruit pitting machine comprising an upper splitting knife, a lower splitting knife, means for reciprocating said knives, a pit ejecting cup formed in two halves having pivoted downwardly extending crossed arms, means carried by the lower knife and projecting between said arms whereby downward movement of the lower knife will cause the ejecting cup to envelope the pit and separate the same from the pulp.

9. A fruit pitting machine comprising a frame, a reciprocable pitting knife carried thereby, having diverging cutting edges and a relieving central portion, means for reciprocating said knife, a pair of fixed splitting knives formed with diverging faces adapted to cooperate with the diverging faces of the movable knife in splitting a fruit, means carried by the upper knife to limit the splitting operation thereof to substantially one-half of the diameter of the fruit being split, thereafter positively moving the fruit against the fixed knives, fruit pitting means disposed in the path of travel of said partially split and movable fruit to penetrate the fruit along the line of the split and to strip the halves of the fruit from the pulp, and means for positively producing the conformation of the pitting means to the contour of the fruit as the reciprocable pitting knife moves.

10. In a fruit pitting machine, relatively movable knives by which a fruit is to be split, a fruit supporting ring, through which the movable knife may pass and a swinging support for said ring, by which a fruit may be accurately placed in position for the splitting operation and removed therefrom.

11. In a fruit pitting machine, relatively movable knives by which a fruit is to be split, a fruit supporting ring, through which the movable knife may pass and a swinging support for said ring, by which a fruit may be accurately placed in position for the splitting operation, and removed therefrom, and yieldable fingers extending downwardly and inwardly from the ring to support various sizes of fruit.

12. In a fruit pitting machine, relatively movable knives by which a fruit is to be split, a fruit supporting ring, through which the movable knife may pass, a swinging support for said ring, by which a fruit may be accurately placed in position for the splitting operation and removed therefrom, and means for holding the ring with the fruit against movement during the downward travel of the movable knife.

13. A fruit pitting machine comprising an upper splitting knife, a lower splitting knife, means for reciprocating the upper knife, means whereby the lower knife will be reciprocated in unison with the upper knife during a portion of the latter's travel, a pit ejecting cup, and means whereby downward movement of the lower knife will actuate the ejecting cup to separate the pit from the pulp.

14. A fruit pitting machine comprising an upper splitting knife, a lower splitting knife, means for reciprocating the upper knife, means whereby the lower knife will be reciprocated in unison with the upper knife during a portion of the latter's travel, and means associated with the lower knife and actuated thereby for removing the pit from the pulp.

15. A fruit pitting machine comprising an upper splitting knife, a lower splitting knife, means for reciprocating the upper knife, means whereby the lower knife will be reciprocated in unison with the upper knife during a predetermined portion of the latter's travel, a pit ejector, and a recessed member at the center of one knife to receive the end of the pit of the fruit being split and by pressure thereagainst to move the fruit onto the other knife, and actuate the pit ejector to remove the pit from the pulp.

16. A fruit pitting machine comprising an upper splitting knife, a lower splitting knife, means for reciprocating the upper knife, means whereby the lower knife will be reciprocated in unison with the upper knife during a predetermined portion of the latter's travel, a pitting member and pit engaging means carried at the center of the upper knife to receive the end of a fruit pit and to force the fruit to the lower knife and cause the pitting member to progressively envelope the pit during the period in which the knives travel in unison.

17. A fruit pitting machine comprising an upper splitting knife, a lower splitting knife, means for reciprocating the upper knife, means whereby the lower reciprocating knife will reciprocate in unison with the upper knife during a predetermined portion of the latter's travel, and a pit enveloping and ejecting means associated with said knives and adapted to operate in conjunction therewith.

18. Fruit splitting means comprising a movable splitting knife having a pair of oppositely inclined cutting edges between which a recess is formed in the knife, a pair of fixed knives, each having an inclined face coacting with an inclined face of the movable knife, said fixed knives being spaced apart a distance to permit a fruit pit to pass therebetween, pit engaging means carried at the center of the movable knife to receive the end of a fruit pit and to force the fruit along the fixed knives and the pit therebetween, fruit pitting means disposed in the path of travel of the pit between the fixed knives and adapted to yieldably follow the contour of the entering half of the pit and means progressively operated as the reciprocable knife moves to cause the pitting means to follow the contour of the other portion of the pit and strip the pulpy halves of the fruit therefrom.

19. Fruit splitting means comprising a movable splitting knife having a pair of oppositely inclined cutting edges between which a recess is formed in the knife, a pair of fixed knives, each having an inclined face coacting with an inclined face of the movable knife, said fixed knives being spaced apart a distance to permit a fruit pit to pass therebetween, pit engaging means carried at the center of the movable knife to receive the end of a fruit pit and to force the fruit along the fixed knives and the pit therebetween, a frame upon which said movable knife is slidably supported, a pair of fruit pitting members adapted to penetrate the fruit as it is moved downwardly onto the fixed knives and to receive the end of the pit, means whereby said pitting members will yieldably conform to the entering half of the fruit and means actuated by the movable knife structure when the pitting members have passed over the large transverse diameter of the pit to positively cause said pitting means to conform to the remaining pit and strip the pulpy halves of the fruit therefrom.

20. Fruit splitting means comprising a movable splitting knife having a pair of oppositely inclined cutting edges between which a recess is formed in the knife, a pair of fixed knives, each having an inclined face coacting with an inclined face of the movable knife, said fixed knives being spaced apart a distance to permit a fruit pit to pass therebetween, pit engaging means carried at the center of the movable knife to receive the end of a fruit pit and to force the fruit along the fixed knives and the pit therebetween, a frame upon which said movable knife is slidably supported, a pair of fruit pitting members adapted to penetrate the fruit as it is moved downwardly onto the fixed knives and to receive the end of the pit, means whereby said pitting members will yieldably conform to the entering half of the fruit and means actuated by the movable knife structure when the pitting members have passed over the large transverse diameter of the pit to positively cause said pitting means to conform to the remaining pit and strip the pulpy halves of the fruit therefrom, and means yieldably supporting said last named means.

21. In a fruit pitting machine a pair of complementary pitting members having out-turned lips forming an elliptical opening into which the tip of a fruit pit may be forced, and means for causing said lips to yieldably conform to the contour of a fruit pit to be forced therebetween and to strip the fruit from the pit.

22. In a fruit pitting machine a pair of pitting members substantially representing portions of a sphere, means for hinging said members together whereby they may have relative movement one to the other, the meeting edges of said members being formed with out-turned lips to produce a substantially elliptical opening therebetween, into which the point of a fruit pit may wedge, yieldable means for holding the lips against a surface of a fruit pit as it is forced into the opening, and positively operated means for closing the lips around the pit after the center of the pit has been reached.

23. In a fruit pitting machine a pair of pitting members substantially representing portions of a sphere, means for hinging said members together whereby they may have relative movement one to the other, the meeting edges of said members being formed with out-turned lips to produce a substantially elliptical opening therebetween, into which the point of a fruit pit may wedge, yieldable means for holding the lips against a surface of a fruit pit as it is forced into the opening, positively operated means for closing the lips around the pit after the center of the pit has been reached, and co-operating blades for splitting the fruit simultaneously with said pitting operation.

In testimony whereof I have hereunto set my hand in the presence of two subscribing witnesses.

THOMAS HENRY ELLIOTT.

Witnesses:
   STANTON B. ABBOTT,
   J. H. EDDY.